United States Patent
Schwarz et al.

(10) Patent No.: US 9,676,277 B2
(45) Date of Patent: Jun. 13, 2017

(54) INVERTER FOR AN ELECTRIC MACHINE AND METHOD FOR OPERATING AN INVERTER FOR AN ELECTRIC MACHINE

(75) Inventors: Albrecht Schwarz, Rutesheim (DE); Matthias Heil, Moeglingen (DE); Axel Haas, Oberstenfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1153 days.

(21) Appl. No.: 13/498,094

(22) PCT Filed: Aug. 3, 2010

(86) PCT No.: PCT/EP2010/061273
§ 371 (c)(1),
(2), (4) Date: Oct. 19, 2012

(87) PCT Pub. No.: WO2011/035970
PCT Pub. Date: Mar. 31, 2011

(65) Prior Publication Data
US 2013/0033908 A1 Feb. 7, 2013

(30) Foreign Application Priority Data
Sep. 24, 2009 (DE) .................. 10 2009 044 944

(51) Int. Cl.
*H02J 7/00* (2006.01)
*H02J 9/00* (2006.01)
(Continued)

(52) U.S. Cl.
CPC ............ *B60L 3/003* (2013.01); *B60L 3/0092* (2013.01); *B60L 7/14* (2013.01); *B60L 11/1803* (2013.01);
(Continued)

(58) Field of Classification Search
CPC ........ H02M 1/10; H02M 7/48; H02M 7/5387; B60L 1/10; H02J 4/00; H02J 9/062;
(Continued)

(56) References Cited

U.S. PATENT DOCUMENTS

| 5,656,922 A * | 8/1997 | LaVelle ................ H02J 7/1438 310/181 |
| 7,279,862 B1 | 10/2007 | Welchko et al. |

(Continued)

FOREIGN PATENT DOCUMENTS

| CN | 101371431 | 2/2009 |
| DE | 102 21 081 | 11/2003 |

(Continued)

OTHER PUBLICATIONS

International Search Report PCT/EP2010/061273 dated Jan. 24, 2012.

*Primary Examiner* — Rexford Barnie
*Assistant Examiner* — Jagdeep Dhillon
(74) *Attorney, Agent, or Firm* — Gerard Messina

(57) ABSTRACT

An inverter for an electric machine as well as a method for operating an inverter for an electric machine. In this context, the inverter has at least one output stage unit for producing a connection between the electric machine and a power supply network, a control unit for controlling the at least one output stage unit, a supply unit independent of the power supply network for the power supply of the output stage unit(s), at least one emergency operation control assigned to the output stage unit(s) for controlling the output stage unit(s) in the fault case, as well as at least one emergency operation supply assigned to the output stage unit(s) for generating a power supply for the output stage unit(s) from the power supply network in the fault case.

16 Claims, 2 Drawing Sheets

(51) Int. Cl.
    *B60L 3/00*     (2006.01)
    *H02M 1/10*     (2006.01)
    *B60L 7/14*     (2006.01)
    *B60L 11/18*     (2006.01)
    *H02M 7/5387*     (2007.01)

(52) U.S. Cl.
    CPC ............ *H02M 1/10* (2013.01); *H02M 7/5387* (2013.01); *Y02T 10/7005* (2013.01)

(58) Field of Classification Search
    CPC ...... H02J 9/061; H02J 1/10; H02J 3/38; H02J 9/06; H02P 5/00
    USPC ............ 307/65, 9.1, 80, 43, 112, 10.1–10.6; 180/65.21, 65.31, 65.51; 363/15, 34, 40, 363/44, 71, 132; 318/139, 140, 143
    See application file for complete search history.

(56) References Cited

U.S. PATENT DOCUMENTS

| | | | | |
|---|---|---|---|---|
| 2003/0052643 | A1* | 3/2003 | Sweo | ........................ H02P 9/007 318/801 |
| 2004/0095111 | A1* | 5/2004 | Kernahan | ............. H02M 3/157 323/282 |
| 2004/0095114 | A1* | 5/2004 | Kernahan | ............. H02M 3/157 323/282 |
| 2004/0095120 | A1* | 5/2004 | Kernahan | ............. H02M 3/157 323/282 |
| 2004/0222766 | A1 | 11/2004 | Kuehner et al. | |
| 2006/0061308 | A1* | 3/2006 | Nakayama | ..................... 318/139 |
| 2007/0070667 | A1* | 3/2007 | Stancu | .................... H02M 1/32 363/132 |
| 2008/0294582 | A1* | 11/2008 | de Kleer | ................. G06N 5/022 706/46 |
| 2008/0304189 | A1* | 12/2008 | Tang | .................... H02H 7/0838 361/33 |
| 2009/0051309 | A1* | 2/2009 | Rehm | .................. H02H 7/0844 318/494 |
| 2009/0118916 | A1* | 5/2009 | Kothari | .................. B60K 6/445 701/53 |
| 2010/0133900 | A1* | 6/2010 | King | .................. B60L 11/1816 307/9.1 |
| 2010/0201199 | A1* | 8/2010 | Yeh | .......................... H02J 1/10 307/80 |
| 2010/0327656 | A1* | 12/2010 | Humphrey et al. | ............ 307/43 |

FOREIGN PATENT DOCUMENTS

| | | |
|---|---|---|
| DE | 10 2006 003 254 | 7/2007 |
| DE | 10 2007 020 509 | 11/2008 |
| DE | 10 2007 06018 | 6/2009 |
| EP | 1 524 761 | 4/2005 |
| JP | 8-35483 | 2/1996 |
| JP | 11-136801 | 5/1999 |
| JP | 2005-223992 | 8/2005 |
| WO | 2007/005629 | 1/2007 |
| WO | WO 2008/135327 | 11/2008 |
| WO | WO 2011-035970 | 3/2011 |

* cited by examiner

INVERTER FOR AN ELECTRIC MACHINE AND METHOD FOR OPERATING AN INVERTER FOR AN ELECTRIC MACHINE

FIELD OF THE INVENTION

The present invention relates to an inverter for an electric machine as well as a method for operating an inverter for an electric machine.

BACKGROUND INFORMATION

Electric machines having inverters are used in hybrid vehicles, for example, where they are optionally operated in motor or generator operation. In motor operation the electric machine generates additional drive torque, which supports an internal combustion engine, for instance, in an acceleration phase, and in generator operation it generates electric power which is stored in an energy store, such as a battery or a Super-Cab. The type of operation and the power of the electric machine are set using the inverter.

Since comparatively high voltages must be provided in hybrid motor vehicles in order to be able to use the electric machine as a motor to drive the motor vehicle, methods are always provided for protecting the electrical network and the components electrically connected to the electrical network, which prevent permanent damage.

Thus, it is understood that one may disconnect the electric energy store electrically from the network when a malfunction of the electric energy store is detected. If the electric machine is in generator operation at this point, the result is that the network voltage increases greatly, which is able to lead to the destruction of the output stages of the inverter. To prevent this, it is discussed in EP 1 524 761 A1, for example, that one may switch the inverter to short circuit operation, in response to the exceeding of a specifiable hold-off voltage.

German patent document DE 102 21 081 A1 discusses an inverter for an electric machine, which includes a plurality of switching elements which are arranged in a bridge circuit, and which produce a connection between the electrical machine and a battery. The switching elements built into the low-side branch of the inverter are ones that are conductive without a control voltage present, i.e., normally-on switching elements. That ensures that if the supply voltage is absent and the electric machine is rotating, the windings of the electric machine are short circuited and no overvoltages are able to occur.

A method in DE 10 2006 003 254 A1 concerns switching off an electric machine using pulse-controlled inverters in the case of interference, provides for minimizing undesired side effects during the switching off of the electric machine and to maximize the regular machine operation, in that the electric machine is first switched to a disconnect operation in which all the switches of the pulse-controlled inverter are open, and subsequently to a short-circuit mode, in which the switches connected to high potential are open and the switches connected to the low potential are closed.

German patent document DE 10 2007 020 509 A1 discusses a method for fault treatment for electric machines of a hybrid drive, in which it is first detected whether at least one operating parameter of the electrical machine is greater than an associated operating parameter boundary value. If it is detected, in the process, that at least one operating parameter is greater than the associated boundary value, a supply connection of the electrical machine is disconnected for a time interval assigned to the operating parameter and, after the expiration of the time interval, the supply connection is short-circuited to ground.

SUMMARY OF THE INVENTION

The inverter according to the exemplary embodiments and/or exemplary methods of the present invention for an electric machine has at least one output stage unit for producing a connection between the electric machine and a power supply network, a control unit for controlling the at least one output stage unit, as well as a supply unit that is independent of the power supply network for the power supply of the output stage unit(s). Furthermore, at least one emergency operation controller assigned to the output stage unit(s), is provided for controlling the output stage unit(s) in the fault case and at least one emergency operation supply assigned to the output stage unit(s), is provided for generating power supply for the output stage unit(s) from the power supply network in the fault case.

By providing at least one emergency operation controller assigned to the output stage unit(s), and at least one emergency operation supply assigned to the output stage unit(s), it is ensured that even during a malfunction of the control unit and/or of the supply unit of the inverter, in particular, output stages of the inverter, in a secure operating state, for instance, a short-circuit operation, are able to be switched so that overvoltages in the power supply network, which could lead to permanent damage to the output stages, are prevented.

According to one specific embodiment of the present invention, the at least one emergency operation controller monitors the operating parameters within the inverter, and diagnoses a fault case if at least one of the operating parameters is below a specified lower threshold value or above a specified threshold value. Thus, it may be monitored whether the supply voltage provided by the supply unit falls below a specified lower threshold value or also exceeds a specified upper threshold value. It may also be monitored, for example, whether the control signals of the control unit are within a specified signal level interval.

The monitoring of operating parameters and the diagnosis of a fault case by the emergency operation controller represent an advantageous specific embodiment in switching technology of the inverter according to the present invention. The monitoring of the operating parameter and/or the diagnosis of a fault case are alternatively also able to be implemented in one or more separate circuit components.

According to a further specific embodiment, the at least one emergency operation supply is developed to be able to be switched on and off. Because of this it is possible, in the case that, after a detected fault case, the operating parameters return to an admissible value range, one is able to switch over from the emergency operation back to normal operation.

According to the method, according to the present invention, for operating an inverter for an electric machine, the inverter having at least one output stage unit for producing a connection between the electric machine and an power supply network, in normal operation the output stage unit(s) is(are) supplied with power via a supply unit that is independent of the power supply network, and controlled via a control unit. In emergency operation, which is activated in the fault case, by at least one emergency operation supply, power for the power supply of the output stage unit(s) is generated from the power supply network, and the output stage unit(s) is(are) controlled by at least one emergency operation controller.

According to one specific embodiment of the method according to the present invention, the at least one emergency operation supply is switched on after the diagnosis of a fault case, and is advantageously switched off again as soon as no fault case is diagnosed any more.

According to one additional specific embodiment, the current flow through the output stages may also be monitored, and upon the diagnosis of an overcurrent, switching to a short-circuit operation is able to be prevented, or a short-circuit operation that has already begun is able to be broken off. In this way, damaging of the output stages by overcurrents may also be prevented.

Further features and advantages of specific embodiments of the present invention result from the following description with reference to the enclosed figures.

DETAILED DESCRIPTION

Figure 1:
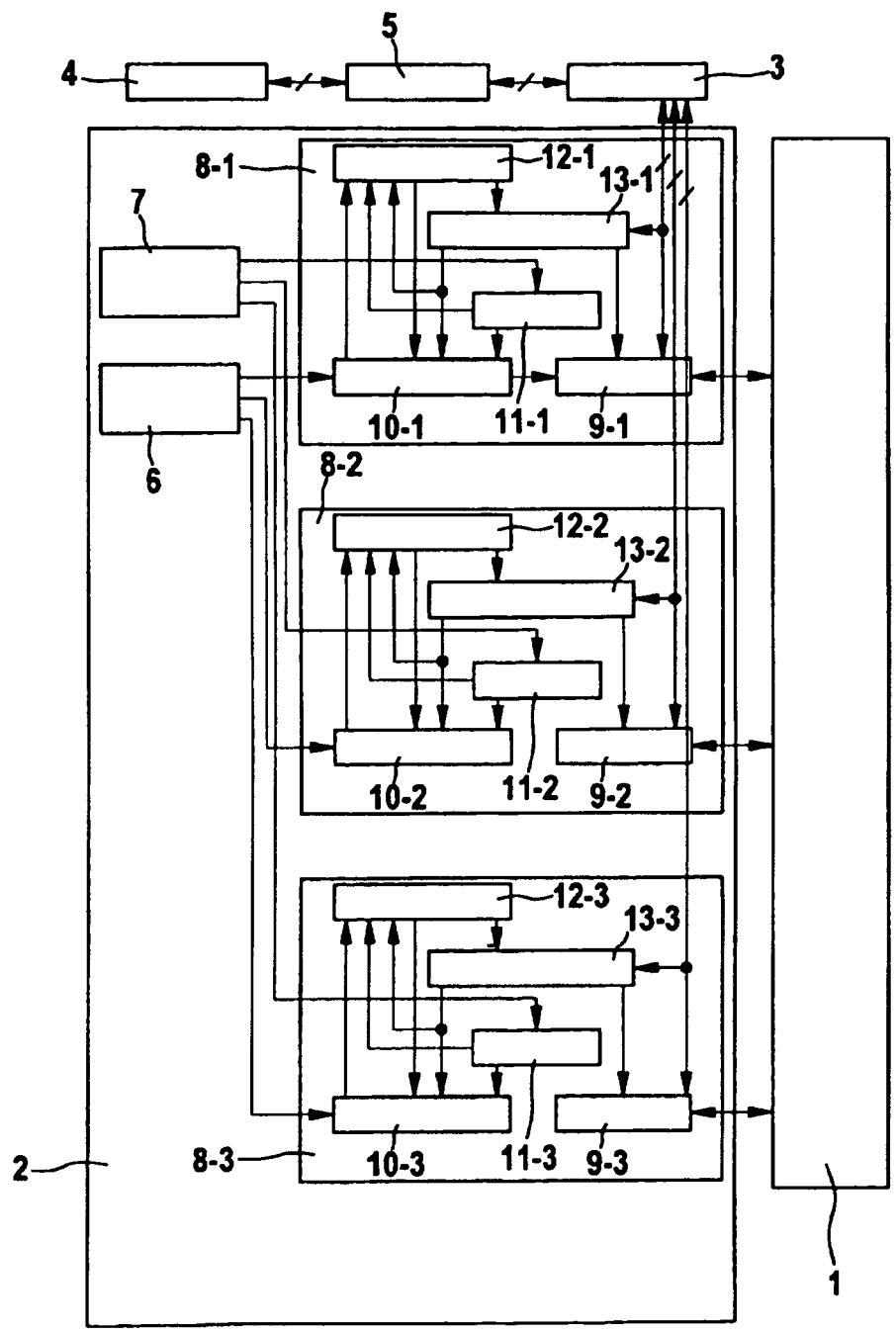
FIG. 1 shows a schematic block diagram of an inverter according to the present invention.

An electric machine 1 is connected via an inverter 2 to an power supply network 3 which, for example, may be designed as a high voltage traction network in a hybrid vehicle. When electric machine 1 is operated in motor operation, it is supplied with power from power supply network 3. During operation in generator operation, the electric machine is, in reverse, able to feed electrical power into power supply network 3. Power supply network 3 is connected to an energy store 4, for instance, a battery. Power supply network 3, especially when detecting a fault function within the electrical network, is able to be separated from energy store 4 via a switch 5. Inverter 2 has a control unit 6, a supply unit 7 as well as output stage units 8. For each phase of electrical machine 1, in each case an output stage unit 8 is provided. In the example shown, a three-phase electric machine is assumed, so that three output stage units 8-1, 8-2 and 8-3 are provided. As a function of the number of phases of electric machine 1, however, more or fewer than three output stage units may be provided.

Supply unit 7 is used for the power supply of output stage units 8-1, 8-2 and 8-3. It is executed independently of power supply network 3 and is fed via the low voltage vehicle electrical system of a hybrid vehicle. The control of output stage units 8-1, 8-2 and 8-3 takes place via control unit 6.

Output stage units 8 each have an output stage 9, for instance, in the form of a power semiconductor circuit, an an output stage control 10. Since the output stage units 8 are designed to be free from potential in the specific embodiment shown, in the output stage units a phase supply unit 11 is provided in each case in output stages units 8, which are connected in each case between supply device 7 and output stage control 10. In normal operation, output stage controls 10-1, 10-2 and 10-3 are supplied via phase supply units 11-1, 11-2 and 11-3 with power from supply unit 7. If output stage units 8 are not designed to be potential-free, phase supply units 11 may also be omitted, and output stage controls 11 may be connected directly to supply unit 7. From control unit 6, output stage controls 10 each receive control specifications which are then converted to suitable control signals for controlling output stages 9.

In order to keep output stage units 8 ready for operation even in case of faulty control or power supply, that is during malfunction or error function of control unit 6 and/or supply unit 7, and to prevent with certainty overvoltages on the power supply network, an emergency operation control 12 and an emergency operation supply 13 are provided. In the error case, the control specifications for output stage controls 10, and thus the control of output stage units 8, is taken over by the respective emergency operation control 12. The power supply for output stage units 8 takes place, in emergency operation, via emergency operation supplies 13, the latter generating the required power from power supply network 3.

In the exemplary embodiment shown, for each output stage unit 8-1 to 8-3 is provided in each case of its own emergency operation control 12-1 to 12-3 and emergency operation supply 13-1 to 13-3. However, alternatively to this, emergency operation controls and/or emergency operation supplies may be provided, which are assigned to all or at least a plurality of output stage units 8. It is only decisive that to each output stage unit 8 that is present and utilized, an emergency operation control 12 and an emergency operation supply 13 be assigned, so that in the error case, a control and an power supply of output stage unit 8, that are independent of control unit 6 and supply unit 7, are ensured.

Since, during the emergency operation, that is, in the fault case, no frequent switching of output stages 9 is required, it is also not necessary to provide a large recharging current by emergency operation supply 13. The latter may consequently be designed for small power losses.

Figure 2:
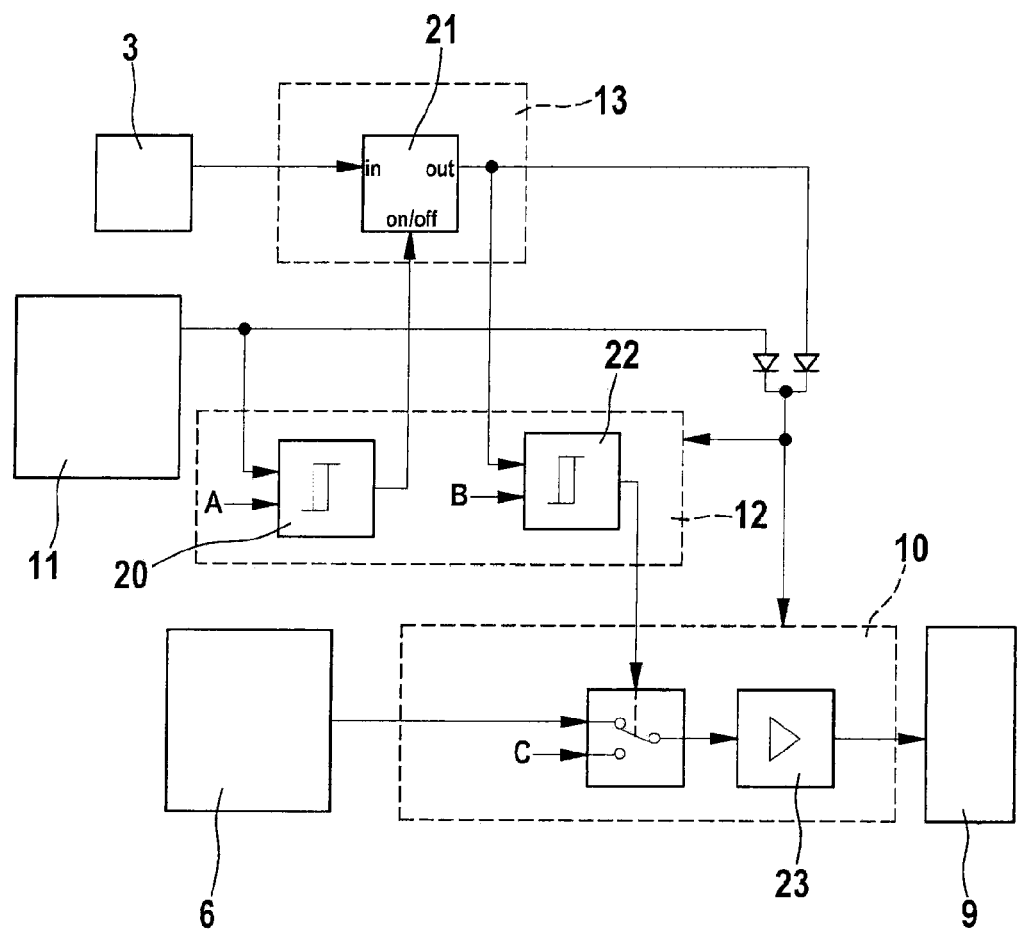
FIG. 2 shows a schematic representation of a circuit device for carrying out the method according to the present invention.

FIG. 2 shows schematically an exemplary circuit for implementing the method according to the present invention. In this context, emergency operation control 12 has a comparator unit 20, for instance, in the form of a threshold value switch, which compares a supply voltage supplied by phase supply unit 11 to a specified lower threshold value A of the supply voltage. If the voltage value supplied by phase supply unit 11 falls below threshold value A, emergency operation supply 13 is switched on, especially a voltage controller 21 provided in it. Emergency operation supply 13 thereupon generates power from power supply network 3.

The voltage, generated in this instance, is compared, for example, by a second comparator unit 22, for instance, an additional threshold value switch, within emergency operation control 12, to a lower threshold value B of the supply voltage. As soon as the voltage generated by emergency operation supply 13 exceeds lower threshold value B, a switching arrangement 23 that is provided in output stage controller 10. This results in output stage 9 now no longer being controlled via a control signal specified by control unit 6, but via an emergency operation control signal C, which has the result, for example, that the low-side switching elements are switched conductively within output stage 9. If this control is used for all present and utilized output stage units 8, a short-circuit operation of inverter 2 is implemented, which certainly prevents an overvoltage in power supply network 3 and, with that, prevents permanent damage to output stages 9

In addition, the current flow through the output stages may also be monitored, and upon the diagnosis of an overcurrent, switching to a short-circuit operation may first of all not be made admissible at all, or a short-circuit operation that has already begun is able to be broken off. In this way, damaging of the output stages by overcurrents may also be prevented.

What is claimed is:

1. An inverter for an electric machine configured to be selectively operated as at least one of a motor and a generator for a hybrid vehicle, comprising:
    at least one output stage unit for producing a connection between the electric machine configured to be selectively operated as at least one of a motor and a generator and a power supply network;
    a control unit for controlling the at least one output stage unit;
    a supply unit, which is independent of the power supply network, for the power supply of the at least one output stage unit;
    at least one emergency operation control assigned to the at least one output stage unit for controlling the at least one output stage unit in the fault case; and
    at least one emergency operation supply assigned to the at least one output stage unit for generating a power supply for the at least one output stage unit from the power supply network in the fault case;
    wherein if the electric machine is selectively operated in a motor operation, the electric machine is supplied with power from the power supply network, and wherein if the electric machine is selectively operated in a generator operation, the electric machine, in reverse, feeds electrical power into the power supply network.

2. The inverter of claim 1, wherein the at least one emergency operation control monitors operating parameters within the inverter and diagnoses a fault case if at least one of the operating parameters lies below a specified lower threshold value or above a specified upper threshold value.

3. The inverter of claim 1, wherein the at least one emergency operation supply is switchable on and off.

4. A method for operating an inverter for an electric machine configured to be selectively operated as at least one of a motor and a generator for a hybrid vehicle, the method comprising:
    producing via the inverter and at least one output stage unit thereof a connection between the electric machine configured to be selectively operated as at least one of a motor and a generator and a power supply network, in which, in normal operation, the at least one output stage unit is supplied with power via a supply unit that is independent of the power supply network;
    controlling the at least one output stage via a control unit; and
    in a fault case, generating power for the power supply of the at least one output stage unit from the power supply network by at least one emergency operation supply and controlling the at least one output stage unit by at least one emergency operation control;
    wherein if the electric machine is selectively operated in a motor operation, the electric machine is supplied with power from the power supply network, and wherein if the electric machine is selectively operated in a generator operation, the electric machine, in reverse, feeds electrical power into the power supply network.

5. The method of claim 4, wherein a fault case is diagnosed by evaluation of operating parameters within the inverter.

6. The method of claim 5, wherein a fault case is diagnosed if at least one of the operating parameters lies below a specified lower threshold value or above a specified upper threshold value.

7. The method of claim 4, wherein the at least one emergency operation supply is switched on after the diagnosis of a fault case.

8. The method of claim 7, wherein the at least one emergency operation supply is switched off again, as soon as no fault case is diagnosed any longer.

9. The method of claim 4, wherein the emergency operation control controls the respective output stage unit so that an overvoltage in the power supply network is prevented.

10. The method of claim 9, wherein the emergency operation control controls the respective output stage unit so that switching elements within the output stage unit are switched to a short-circuit operation.

11. The method of claim 10, wherein the emergency operation control controls the respective output stage unit so that an overcurrent in the output stage is prevented.

12. The method of claim 11, wherein, in response to a diagnosis of an overcurrent the switching into the short-circuit operation is not prevented or a short-circuit operation is broken off.

13. The method of claim 4, wherein a fault case is diagnosed by evaluation of operating parameters within the inverter, and wherein the emergency operation control controls the respective output stage unit so that switching elements within the output stage unit are switched to a short-circuit operation.

14. The method of claim 4, wherein a fault case is diagnosed by evaluation of operating parameters within the inverter, wherein the emergency operation control controls the respective output stage unit so that an overvoltage in the power supply network is prevented, and wherein the emergency operation control controls the respective output stage unit so that switching elements within the output stage unit are switched to a short-circuit operation.

15. The inverter of claim 1, wherein a fault case is diagnosed by evaluation of operating parameters within the inverter, and wherein the emergency operation control controls the respective output stage unit so that switching elements within the output stage unit are switched to a short-circuit operation.

16. The inverter of claim 1, wherein a fault case is diagnosed by evaluation of operating parameters within the inverter, wherein the emergency operation control controls the respective output stage unit so that an overvoltage in the power supply network is prevented, and wherein the emergency operation control controls the respective output stage unit so that switching elements within the output stage unit are switched to a short-circuit operation.

* * * * *